April 9, 1957
R. L. BRIGHT
2,788,449
ADJUSTABLE MULTIVIBRATOR
Filed June 25, 1954
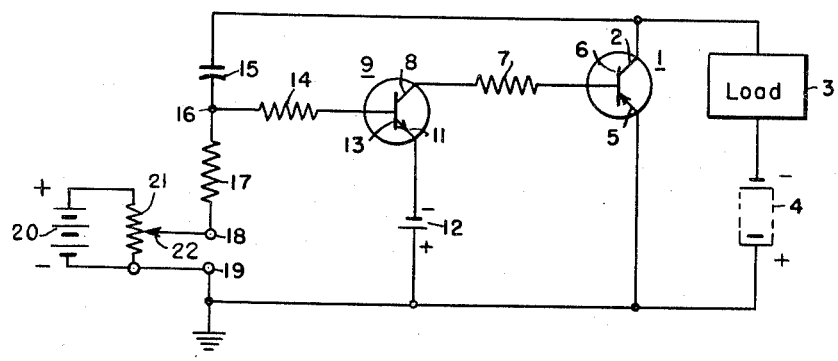
WITNESSES:
E. A. M. Closkey.
Leon M. Garman
INVENTOR
Richard L. Bright.
BY
F. E. Browder
ATTORNEY

United States Patent Office 2,788,449
Patented Apr. 9, 1957

2,788,449
ADJUSTABLE MULTIVIBRATOR

Richard L. Bright, Adamsburg, Pa., assignor to Westinghouse Electric Corporation, East Pittsburgh, Pa., a corporation of Pennsylvania Application June 25, 1954, Serial No. 439,297

2 Claims. (Cl. 250—36)

My invention relates to circuits employing transistors and, in particular, relates to a transistor circuit which functions as a multivibrator producing voltage pulses in which the ratio of positive to negative periods is controlled by variations of a direct-current bias voltage.

An object of my invention is accordingly to provide a novel form of electrical generator of periodic voltage pulses.

Another object is to provide a novel electrical pulse generator in which the relative duration of the positive and negative pulses may be varied over a substantial range by varying the magnitude of a direct-current bias voltage. Other objects of my invention will become apparent through reading the following description taken in connection with the drawings, in which the single figure is a schematic diagram of a circuit embodying the principles of my invention.

Referring to the drawing in detail, a first transistor 1 which is of the type known as p-n-p described in the book entitled "Principles of Transistor Circuits," by R. F. Shea, published by Wiley and Sons, New York, 1953, has its collector electrode 2 connected through a resistance load 3 to the negative pole of a direct-current source 4, and has its emitter electrode 5 connected to the positive pole of source 4. The base 6 of transistor 1 is connected through a first resistor 7 to the collector electrode 8 of a second transistor 9 which is of the n-p-n type. The emitter electrode 11 of transistor 9 is connected to the negative-pole of a second direct-current source 12 which has its positive pole connected to the emitter 5 of transistor 1. The base electrode 13 of transistor 9 is connected through a second resistor 14 and a capacitor 15 to the collector 2 of transistor 1. The common junction 16 of resistor 14 and capacitor 15 is connected through a third resistor 17 to the positive pole 18 of a variable direct-current bias source. The variable bias source comprises battery 20, resistor 21 and adjustable contact 22. The negative pole 19 of this variable bias source is connected to the positive pole of direct-current source 12.

The mode of operation of my above-described circuit is substantially as follows. Assuming that there is a positive charge on the lower plate of capacitor 15, the voltage sources 4, 12 and 18-19 will render both transistors 1 and 9 conducting, and the collector 2 of transistor 1 will be at substantially the same electrical potential as pole 18 which may be grounded. The upper terminal of load resistor 3 will be positive relative to its lower terminal by about the voltage of direct-current source 4 and capacitor 15 will discharge through resistors 14 and 17. This situation will continue until the current through resistor 14 drops below the value necessary to keep transistor 9 saturated, whereupon the current through resistor 7 will drop and transistor 1 will become non-conductive. The flow of current through it to load resistor 3 drops and the potential of the collector electrode 2 of transistor 1 falls nearly to the negative value of the upper pole of voltage source 4. This negative potential is passed on through capacitor 15 and makes the potential of terminal 16 highly negative to pole 18 of the bias source. A condition is thus reached in which the upper terminal of load 3 is negative relative to its lower terminal, capacitor 15 has been discharged, and transistors 1 and 9 are non-conductive.

Voltage source 4 then starts charging through resistor 17 until terminal 16 becomes approximately equal in potential to the upper terminal of source 12, whereupon transistor 9 becomes conductive. The system has thus returned to its initial conduction as described above. The setting of the bias between terminals 18 and 19, by means of the adjustable contact 22, determines the voltage to which capacitor 15 has discharged when terminal 16 attains the potential at which transistor 9 becomes conductive and so times the charging phase of capacitor 15 and the length of the negative half-period of the load voltage.

While I have illustrated the principles of my invention by describing a circuit in which the transistor 1 is of p-n-p type and transistor 9 of n-p-n type, the types of both transistors may be interchanged provided the polarities of all direct-current sources are reversed.

I will tabulate below a very specific example of a circuit well adapted for using my invention, although men skilled in the transitor art are well able to design other circuits by applying methods known in the art.

| Transistor #1 | 2N60. |
|---|---|
| Transistor #9 | 2N55. |
| Source 4 | 22.5 volts. |
| Source 12 | 1.5 volts. |
| Sources 18—19 | +22 volts. |
| Capacitor | .01 microfarad. |
| Resistor 7 | 100 ohms. |
| Resistor 17 | 100k ohms. |
| Resistor 14 | 100k ohms. |

I claim as my invention:

1. An oscillation generator comprising a first transistor of one semiconductor type having its collector electrode and its emitter electrode interconnected through a load and a first direct-current source, a second transistor of the other semiconductor type having its collector electrode connected through a first resistor to the base electrode of said first transistor, and having its emitter electrode connected to the emitter electrode of said first transistor through a second direct-current voltage source, a channel comprising a second and a third resistor in series with a direct-current bias source connecting the emitter electrode of said first transistor to the base electrode of said second transistor, and a capacitor connected between the common junction of said second and third resistors and the collector electrode of said first transistor.

2. The arrangement specified in claim 1 in which means are provided for adjusting said bias source.

References Cited in the file of this patent
UNITED STATES PATENTS

| 2,420,013 | Rajchman | May, 6, 1947 |
|---|---|---|

OTHER REFERENCES

Article: "Duality as a Guide In Transistor Circuit Design," by Wallace et al.; pages 127–164 of "The Transistor," published by Bell Laboratories Inc., Dec. 4, 1951.

Article: "Symmetrical Properties of Transistors and Their Applications," by Sziklai, pages 717–724 of Proc. IRE for June 1953.

"Complementary Symmetry Transistor Circuits," by Lohman, pp. 140–143, of Electronics for Sept. 1953.